No. 797,346. PATENTED AUG. 15, 1905.
M. DAIGER.
PLATE GLASS PLANT.
APPLICATION FILED MAR. 30, 1905.

3 SHEETS—SHEET 2.

WITNESSES:

INVENTOR
M. Daiger.
BY
ATTORNEYS

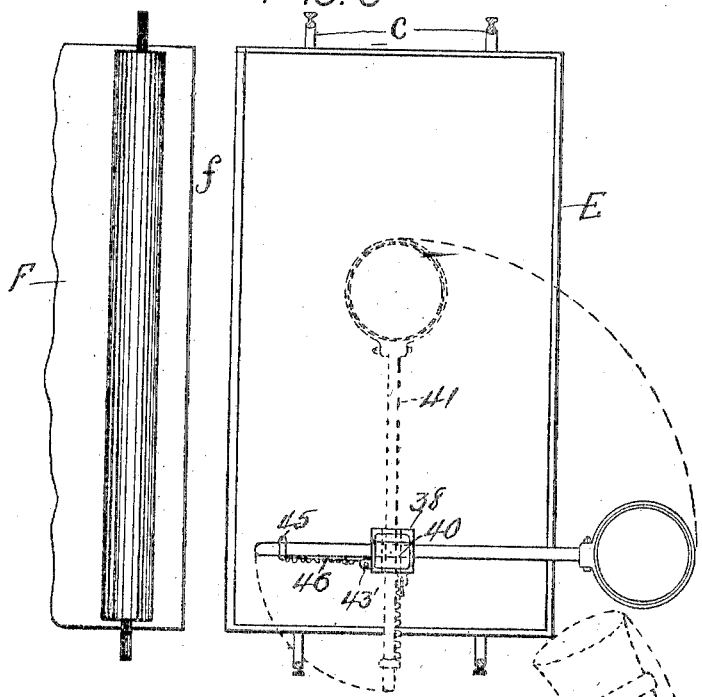
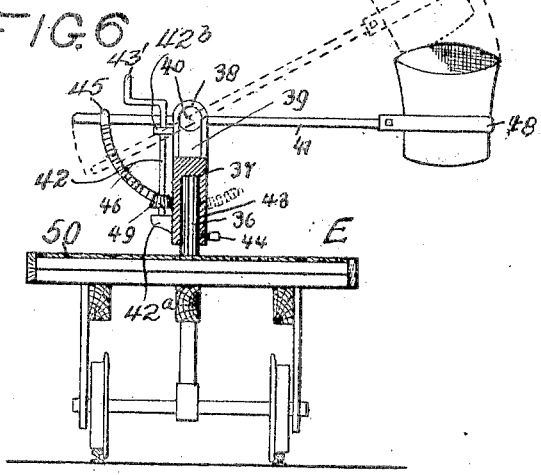

UNITED STATES PATENT OFFICE.

MARY DAIGER, OF NATRONA, PENNSYLVANIA.

PLATE-GLASS PLANT.

No. 797,346. Specification of Letters Patent. Patented Aug. 15, 1905.

Application filed March 30, 1905. Serial No. 252,876.

*To all whom it may concern:*

Be it known that I, MARY DAIGER, a citizen of the United States of America, residing at Natrona, in the county of Allegheny and State of Pennsylvania, have invented certain new and useful Improvements in Plate-Glass Plants, of which the following is a specification, reference being had therein to the accompanying drawings.

This invention relates to certain new and useful improvements in plate-glass plants, and more particularly to the manufacture of plate-glass and means for accomplishing the same, which will be hereinafter clearly described and then specifically pointed out in the claims.

Reference will now be had to the drawings accompanying this application, wherein like characters of reference designate corresponding parts throughout the several views, in which—

Figure 1:
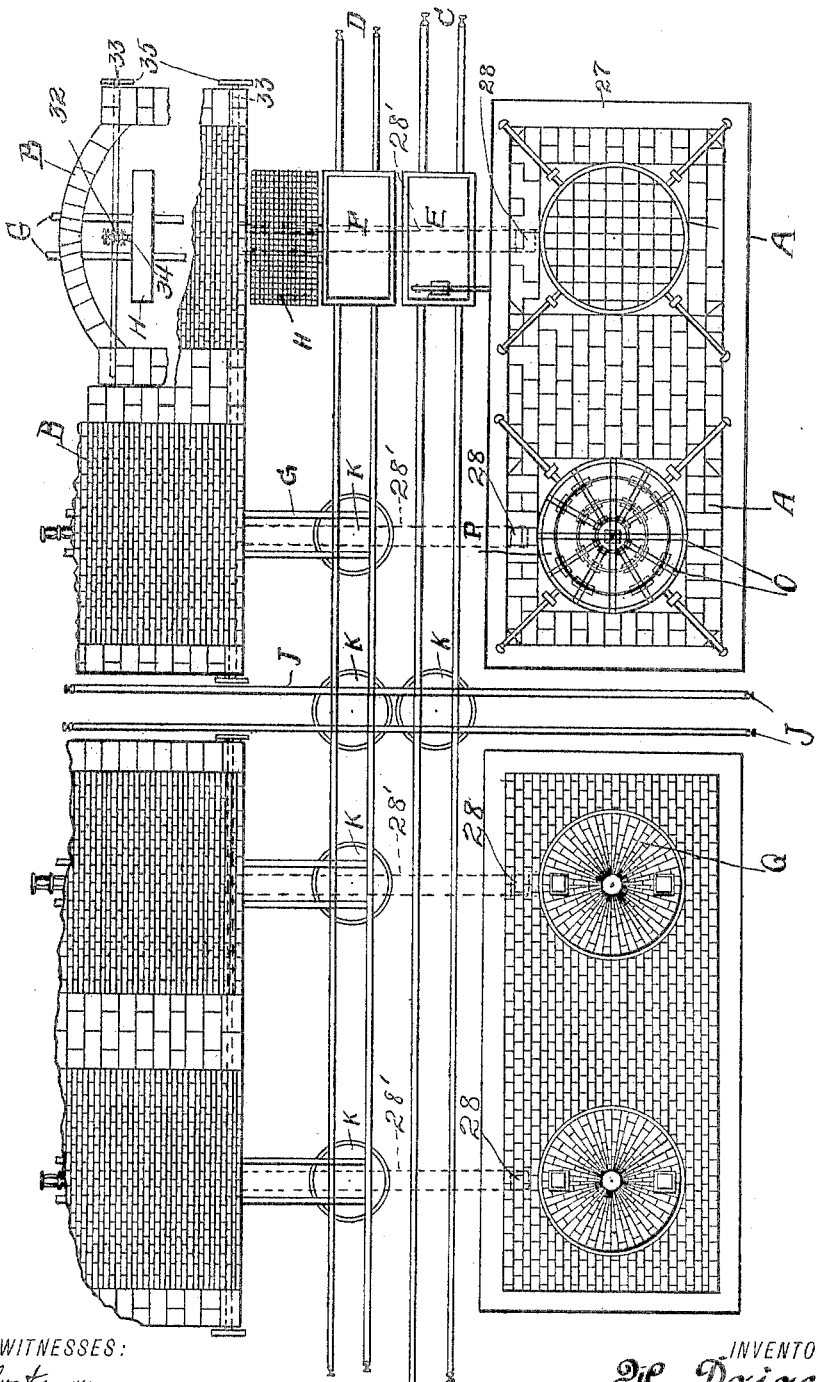
Figure 2:
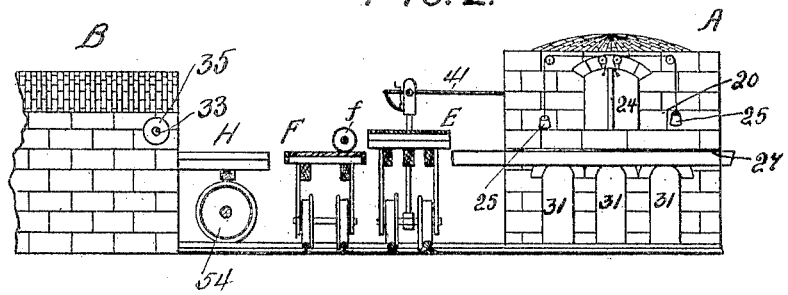
Figure 3:
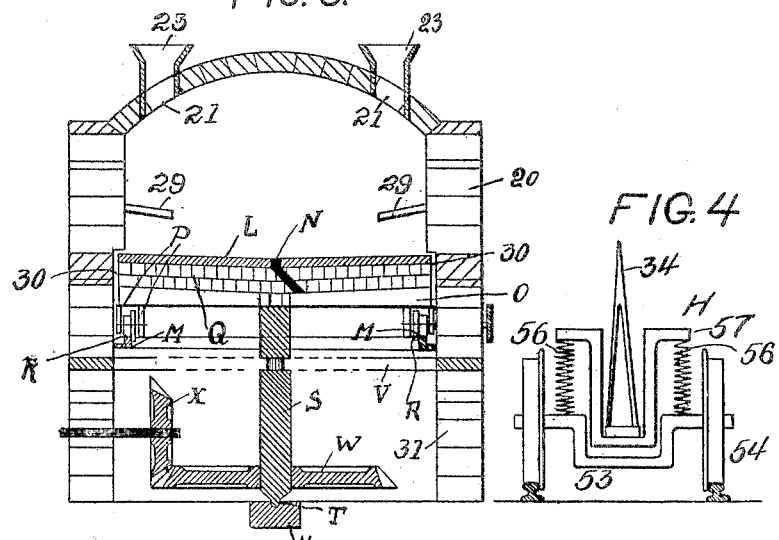
Figure 4:
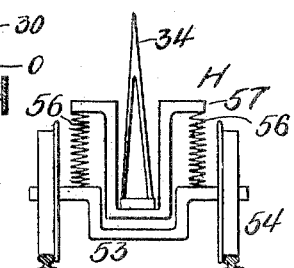
Figure 7:
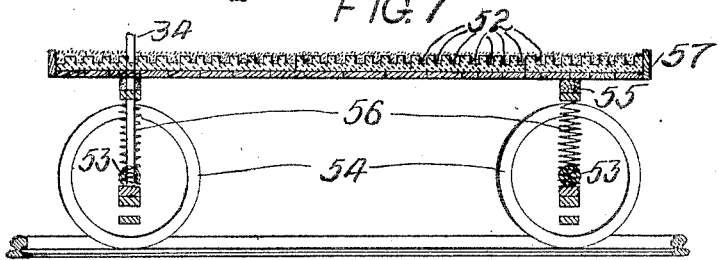

Figure 1 is a plan view of a plant embodying my invention. Fig. 2 is a side elevation of an oven and annealing-furnace, showing the trucks and one of the annealing-cars arranged in an operative position. Fig. 3 is a vertical central sectional view of one of the ovens. Fig. 4 is a detail view of the running-gear of one of the annealing-cars. Fig. 5 is a plan view of a crane-truck, and Fig. 6 is a vertical sectional view of the annealing-car. Fig. 7 is a longitudinal sectional view of the same.

My invention contemplates the provision of means for quickly and effectively heating the melting-pots or "glass-pots," means for removing them from the ovens and depositing their contents upon the rolling-tables or rolling-surfaces, and means for removing the rough or unfinished plates from the rolling-tables and conveying them at the proper rate of speed through the annealing-furnaces.

The object of my invention is to provide such means as will obviate repeated and unnecessary handlings and insure the proper manipulation of the glass from the time that the crude article is placed in the melting-ovens until it is delivered properly annealed and tempered at the rear ends of the furnaces.

In carrying out these objects I employ a series of melting-ovens A A, Fig. 1, and a corresponding series of annealing-furnaces B B, arranged, respectively, opposite the ovens with their front ends or mouths on a line parallel with the opposite faces of the ovens, as shown in the above-mentioned figure.

Between the opposite faces of the ovens and furnaces are arranged two parallel tracks or road-beds C and D, respectively, which extend parallel with the faces of the ovens and furnaces and bear the crane-truck E and the rolling-truck F, hereinafter more fully described. The track C carries the crane-truck, the latter being thus maintained close to the faces of the ovens in a position to remove the glass-pots. The crane-truck may be arranged in front of either of the ovens. The track D carries the rolling-truck, as shown, thus enabling the latter to be moved with the crane-truck, so as to be adjacent thereto when a glass-pot is being removed from an oven. Additional tracks G extend longitudinally through the annealing-furnaces to convey the annealing-cars H, and return-tracks J extend parallel with the annealing-furnaces and outside the same to connect with the track D and thence with the track G, so that after an annealing-car has been unloaded at the rear end of one of the furnaces it may be sent over track J to the track D and thence to one of the tracks G in position to be reloaded. Turn-tables, such as are shown at K, Fig. 1, are employed at the intersections of the various tracks to enable the cars to be transferred without loss of time from one track to another.

In the drawings I have shown but one series of ovens and an opposite series of annealing-furnaces; but in practice it is preferable to duplicate this arrangement by placing a second series of furnaces upon the opposite side of the series of ovens, the return-track J being extended through the series of ovens in Fig. 1 to indicate the manner of connecting the various tracks employed. When constructed in this manner, the ovens may be "worked" from either side or (preferably) both sides. A description of the portion of the plant which I have illustrated in the drawings will, however, serve to explain the construction and operation of the parts, it being understood that the parts may be multiplied at will to produce a plant of the desired size and capacity.

By means of the mechanism upon the crane-truck the melting-pots may be removed from the oven and their contents deposited upon the rolling-truck, a roller $f$ being provided to enable the operators to spread the glass out evenly over the surface of the truck and form a plate. The sheet is then transferred to the annealing-car, which has previously been placed adjacent thereto, and is introduced into the annealing-furnace. This car moves slowly through the furnace drawn by an endless chain, which is carried by suitable pulleys at opposite ends of each furnace, thus allowing the glass to cool and harden gradually, and when the car reaches the rear end of the furnace the glass is sufficiently cooled to be removed and conveyed to the proper place for grinding and polishing. My invention does not refer to these subsequent processes of finishing, but refers only to the initial processes of melting, rolling, and annealing, as described.

The ovens are of masonry, the pit or interior being circular in form, and within the pit at a convenient elevation above the ground is a circular horizontal fire-bed L, mounted upon a circular track M and adapted to be rotated continuously by means of suitable machinery. The fire-bed is depressed slightly toward its center and is provided at its lowest point with an outlet N to supply drainage in case of the breakage of one of the melting-pots.

The construction of the fire-bed is as follows: O O are cross-timbers intersecting at their centers and connected at their outer ends and at intervals between their extremities and their centers by circular metallic braces P P, a plurality of layers Q Q of fire-brick or fire proof stone being supported upon said framework of timbers and braces. This fire-brick forms the surface of the fire-bed. The braces P P carry rollers R R to travel upon the above-mentioned track M, and a vertical king-post S is secured at its upper end to the intersection of the cross-timbers and is provided at its lower end with a spindle T, which is seated in a socket U at the bottom of the pit. The king-post is also journaled at an intermediate point in a horizontal beam V, the ends of which are fixed in the masonry walls of the oven. A gear-wheel W is secured to the king-post and meshes with a pinion X, which is adapted to be driven by any suitable machinery. (Not shown.) The oven proper is above the fire-bed, as will be understood, openings 20 being provided in the sides thereof for the introduction and removal of the melting-pots, and traps 21 are arranged in the top of the oven and are or may be provided with suitable slides or doors. Small hoppers communicate with the traps to enable the blocks or lumps of crude glass to be readily introduced into the melting-pots, one of these hoppers 23 being arranged adjacent to each of the main openings 20. The openings 20 are provided with sliding doors 24, formed in pairs and provided with counterbalancing-weights 25 to cause them to close automatically upon being released. As is the usual custom, glory-holes are provided in the sides of the oven, and a platform 27 is arranged on the plane of the fire-bed to enable the operators to walk around the oven to inspect the interior. Vertical draft-flues 28 are formed in the walls and communicate with the oven proper to carry off the products of combustion, and the said flues further communicate, by means of suitable underground flues 28', with the annealing-furnaces near their front ends to produce a high temperature in the latter at the points where the glass plates enter. The heat within the oven is supplied by the combustion of fuel-gas or other suitable gaseous fluid, which is introduced by means of burner-pipes 29, and the necessary air to support combustion enters between the periphery of the rotary fire-bed and the adjacent walls of the oven, a sufficient annular space 30 being afforded for that purpose.

The fireproof stone which is used in the construction of the fire-bed prevents the conduction of heat to the space below the fire-bed, and thus prevents the expansion of the operating mechanism and guards against the loss of heat. The space below the fire-bed is provided with a series of arched openings 31 to provide ventilation and enable the gearing to be reached for adjustment, cleaning, &c.

The annealing-furnaces are arched structures, through which extend tracks to convey the annealing-cars, and an endless-chain conveyer 32, carried by pulleys or sprockets on the shafts 33, is arranged in each furnace above the tracks, the annealing-cars being provided at their front ends with vertical cone-shaped hooks or detents 34 to engage the links of the conveyer. As a loaded car is pushed into an annealing-furnace this hook or detent is engaged by a link of the conveyer as the latter passes downwardly over the adjacent sprocket, and the car is then drawn slowly through the furnace until it reaches the rear end, when the hook or detent is disengaged by the rising of the conveyer over the sprocket at the rear end of the furnace. The shafts 33 are provided at their projecting ends with belt-pulleys 35 or their equivalents, whereby they may be operated by suitable machinery. (Not shown.)

The crane-truck is provided with a central mast 36, upon the upper end of which is mounted a revoluble cap 37, carrying a yoke or strap 38, having a central slot 39. A roller 40 is fitted in the yoke and is adapted to rock therein, and the crane-shaft 41 passes centrally through the roller and operates in the slot 39. The crane-shaft slides longitudinally in the transverse diametrical opening in the roller in order to enable the melting-pots to be drawn out of the openings in the sides of the oven. A curved rack-bar 46 is suitably supported from the collar 43 and has a notched or forked upper end 45 to receive the crane-shaft 41, this rack-bar being operated by a rod or shaft 42, journaled in bearings $42^a$ $42^b$ and carrying a pinion 49 near its lower end. On its upper end this rod or shaft 42 is provided with a suitable crank 43'. The collar 43 is locked to the mast 36 in any desired position by means of a set-screw 44. The curved rack-bar 46 may be supported from the collar 43 in any desirable manner, as by a keeper, (not shown,) through which it operates.

In operation the crane is extended into the oven and its forked end is engaged with one of the melting-pots, after which the crane-shaft is drawn back and the melting-pot is elevated and swung over the rolling-truck, the contents of the pot being then deposited upon the surface of the rolling-truck by turning the crane-shaft in its bearing in the roller. The crane-truck is provided with a fire-brick platform 50 on the plane of the fire-bed to support the operator. The rolling-truck is provided with a flat horizontal surface upon which the melted glass is deposited, and by means of a roller $f$ of the ordinary or any preferred form the glass is spread evenly over the surface preparatory to annealing. The annealing-car, to which the plate of glass is subsequently transferred, is provided with a series of small recesses or depressions 52 in its surface, said recesses or depressions being filled and the surface of the car being covered with sand, upon which the plate is placed. The running-gear 53 of the annealing-car consists of crank-axles which carry the wheels 54, and the resilient frame 55 rests upon the axles and is separated therefrom by small springs 56. The platform or table 57 of the car is supported upon the said frame, thus preventing the jarring of the glass *in transitu*. The frame 55 carries at its front end the vertical hook or detent above described.

It will be noted that the glass passes directly from the ovens to the annealing-furnaces with but one intermediate handling—namely, when the plate is transferred from the rolling-table to the annealing-car. The distance from the ovens to the annealing-furnaces is only a few feet, just sufficient to accommodate the necessary trucks and enable the operators to properly handle the glass, and hence the heat of the glass is not wasted as when the glass is conveyed a considerable distance to the rolling-tables and thence to the annealing-furnaces.

The rolling-table which I have described in connection with my invention is operated in contact with the crane-truck and moves therewith from one oven to the next, as the operator desires, and the glass before it reaches the rolling-table is only exposed during the time that the crane is being swung around in position to discharge the contents of the melting-pot upon the table. From the rolling-table the plate is transferred directly to the annealing-car, which is at the mouth of its respective furnace, and after receiving its load the car is immediately started on its trip through the said furnace. After emptying a melting-pot it is replaced in the oven and filled by means of the hopper and trap, which are arranged adjacent to the opening in the oven, as before described.

Having thus described my invention, what I claim, and desire to secure by Letters Patent of the United States, is—

1. The combination, in a plate-glass plant, of the ovens, arranged in series, the annealing-furnaces, disposed, respectively, opposite the ovens, and the intermediate, movable rolling-table, adapted to be arranged in front of either of the ovens, substantially as specified.

2. The combination of the ovens, arranged in series, the annealing-furnaces, disposed, respectively, opposite the ovens, the intermediate movable rolling-table, and the annealing-cars, adapted to be arranged adjacent to the rolling-table in its various positions, substantially as specified.

3. The combination of the ovens, arranged in series, the annealing-furnaces, disposed, respectively, opposite the ovens, the rolling-table, carried by a truck which operates on tracks which extend parallel with the faces of the ovens, and the annealing-cars operating on tracks which extend longitudinally through the annealing-furnaces, substantially as specified.

4. The combination of the ovens, arranged in series, the annealing-furnaces, disposed, respectively, opposite the ovens, the rolling-truck carried by tracks which extend parallel with the faces of the ovens, the return-tracks extending through the annealing-furnaces and connecting with the tracks for the rolling-trucks, and the annealing-cars, substantially as specified.

5. The combination of the ovens, arranged in series, the annealing-furnaces, disposed, respectively, opposite the ovens, the rolling-truck carried by tracks parallel with the faces of the ovens, the crane-truck carried by tracks parallel with the ovens, and the annealing-cars carried by tracks which extend longitudinally through the annealing-furnaces, substantially as specified.

6. The combination of the ovens and annealing-furnaces, arranged in opposite parallel series, and a movable rolling-truck carried by a track which is arranged between and parallel with the said series of ovens and furnaces, substantially as specified.

7. The combination with a melting-oven, and an annealing-furnace, of tracks arranged between said oven and said furnace, a crane-truck on one of said tracks for removing the pots from the furnace, a rolling-table on the other of said tracks to receive the glass from the crane-truck, an annealing-truck, a track extending into the annealing-oven on which said annealing-truck travels and means for moving said annealing-truck through the annealing-furnace at a desired rate of speed.

8. The combination with a melting-oven and an annealing-furnace, of a plurality of tracks arranged between the melting-oven and the annealing-furnace, a track arranged in the annealing-furnace, an annealing-car on said latter track, means for removing the glass from the melting-oven and delivering same to the annealing-car, means for moving said annealing-car through the annealing-oven at a desired rate of speed, and tracks arranged for returning the annealing-car to the annealing-furnace track.

In testimony whereof I affix my signature in the presence of two witnesses.

MARY DAIGER.

Witnesses:
E. E. POTTER,
C. KLOSTERMANN.